United States Patent [19]
Beranek et al.

[11] 3,785,171
[45] Jan. 15, 1974

[54] ABSORPTION COOLING DEVICE

[75] Inventors: Miroslav Beranek, Donberg; Heinz G. Krumm, Ennepetal-Milspe, both of Germany

[73] Assignee: Firma Vorwerk & Co., Elektrowerke K G, Wuppertal-Barmen, Germany

[22] Filed: June 12, 1972

[21] Appl. No.: 262,078

[30] Foreign Application Priority Data
June 11, 1971 Germany.................. P 21 28 931.6

[52] U.S. Cl................. 62/490, 29/157.3 R, 62/493
[51] Int. Cl............................................. F25b 15/10
[58] Field of Search.............. 62/490, 491, 492, 62/493, 476; 29/157.3 R

[56] References Cited
UNITED STATES PATENTS
3,134,245  5/1964  Phillips et al. ...................... 62/490
2,487,001  11/1949  Taylor et al. .............................. 62/1
3,464,221  9/1969  Stierlin et al. ..................... 62/490 X
3,078,690  2/1963  Phillips et al. ......................... 62/491

Primary Examiner—William F. O'Dea
Assistant Examiner—Peter D. Ferguson
Attorney—Ernest G. Montague

[57] ABSTRACT

An absorption-cooling unit which comprises a collector and a plurality of conduits originating from the collector and at least partly boxed into each other. A collector housing includes at least two cap parts welded together in a cross-plane and having bottom faces. The conduits start from the bottom faces of the collector housing.

4 Claims, 6 Drawing Figures

ABSORPTION COOLING DEVICE

The present invention relates to an absorption cooling-unit with conduits originating from a collector and boxed into each other for parts of the length of the conduits.

Such absorption cooling-units are produced essentially in a manual welding process. For this purpose, the tubes or conduits are mostly already previously bent into their end form and then welded together. This manner of production is, however, expensive as to labor and thereby requires high costs.

It is one object of the present invention to provide an absorption cooling-unit such, that due to particular construction and arrangement of as much as possible many conduits coordinated to the collector are capable of being manufactured in the simplest manner, preferably with extensive application of automatic welding processes, which are known per se. In recent years, a number of welding processes have been known, which are capable of being automatized, as by example the protection gas welding with a tungsten-electrode or welding with a melting electrode under protection gas or protection gas-active-gas mixtures.

It is another object of the present invention, to provide an absorption cooling-unit wherein the conduits start out in coaxial position from the bottom faces of one collection housing which consists of at least two cap parts welded together in a cross plane.

It is favorable thereby, if in accordance with the present invention, an outer tube originates from one cap part, which outer tube extends through the collector and enters on a coaxially opposite position as gas heat exchanger inner tube into the gas heat exchanger outer tube emerging from the other cap part.

An advantageous design of the present invention resides furthermore in the fact, that the outer tube starting from one cap part and extending through the collector extends throughout over the liquid heat changing path, the boiler path, the rectification path, the boiler rising tube path, and the dephlegmator path up to the liquefier and surrounds the inner tube terminating separately in the collector, up to the boiler rising tube path, and only after boxing into each other and provision of all tubes-welding seams is bent from the straight extension into the desired curved arrangement.

Finally, a favorable proposal of the present invention resides also in the fact, that the absorber coil exits in the vicinity in the bottom of the one cap part cross-wise from the cap wall and enters with its opposite end into the outer tube passing the bottom of the same cap part, which outer tube forms here the gas heat exchanger inner tube.

Finally, an advantageous solution of the present invention resides in the fact that in the liquefier a displacement tube is provided for the increase of the steam speed.

Due to such construction, an absorption cooling-unit is created which is easily producable and mountable, respectively, and by use of the advantages of an automatic welding process is capable of being manufactured with low production costs. Concerning the production as the starting point is the two part collector. To each of the cap parts of this collector the prevailing conduit or tube is arranged as extending in the axis of the collector. These conduits retain thereby their straight position. Accordingly rotation symmetrical and approximately rotation symmetrical parts, respectively, are present. They permit advantageously an automatic welding and then a sliding into each other, whereby as last welding step in the preliminary state of the production the joining of the cap parts takes place. If all parts are welded together, the necessary tube deformations are performed, in order to obtain the typical structure for the absorption unit, whereupon thereafter it is only necessary to weld on a few connection tubes. In order to obtain concerning the liquefying tube, which is due to the proposal of the present invention about passing through from the start to the end of the unit, a cross section adjustment in the liquefier range, the displacement tube is provided there.

With these and other objects in view, which will become apparent in the following detailed description, the present invention, which is shown by example only, will be clearly understood in connection with the accompanying drawings in which:

FIG. 1a is an elevation of a prefabricated mounting unit;

FIG. 1b is a side elevation of a preformed tube section of the unit;

Figure 1:
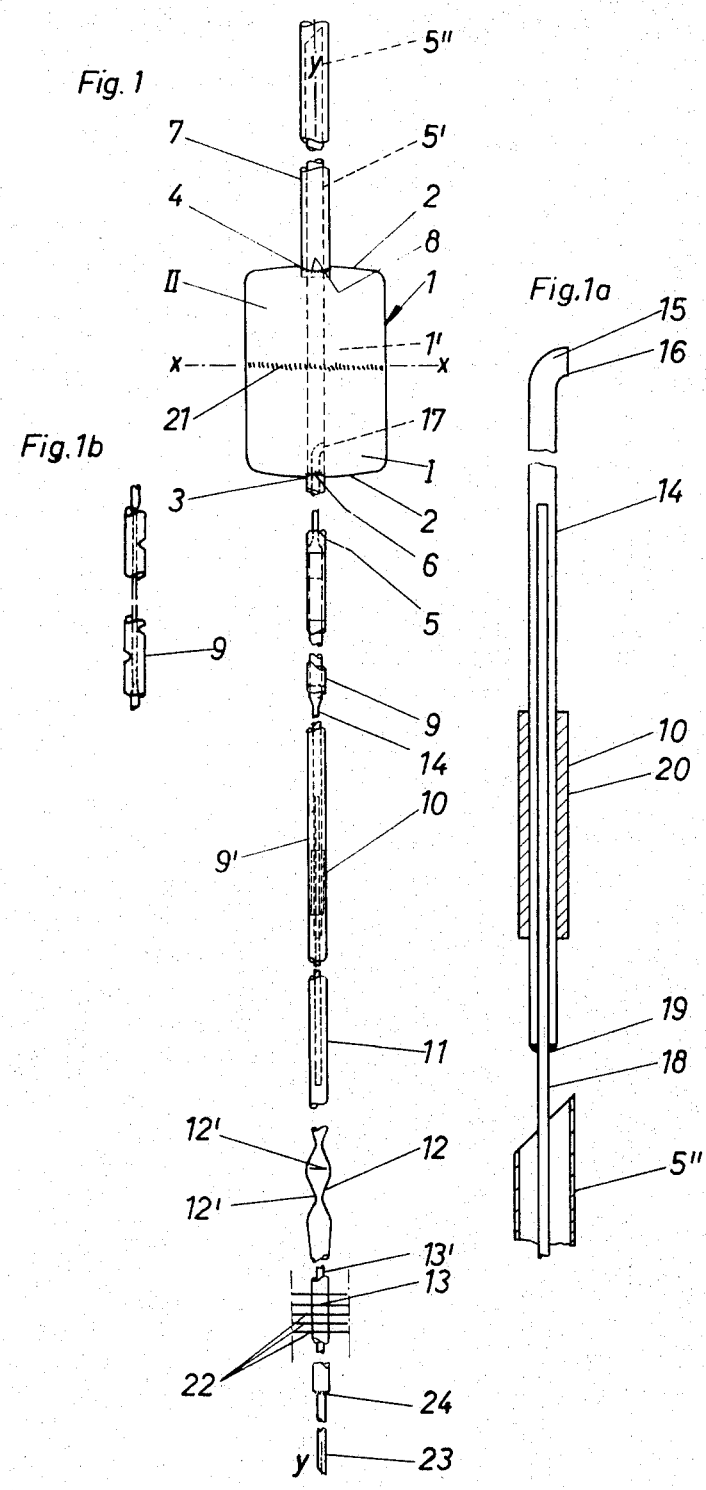
FIG. 1 is an elevation in a so-called first production state (connection of the rotation symmetrical basic constructural parts)

Referring now to the drawings, the absorption cooling unit has a collector 1. The latter comprises two cap-parts I and II welded together in a cross plane $x-x$ (FIG. 1). Both cap parts have an outer curved cap bottom 2. In the center of the cap bottom 2 of the cap part I is disposed a circular opening 2. A corresponding circular opening 4 is arranged in concentric location also in a cap bottom 2 of the cap part II. The latter opening is of a larger diameter than that of the opening 3.

From the cap part I emerges an outer tube 5. The latter passes centrally through the collector 1 in the direction of its largest length path. It is connected by the round seam 6 on the edge of the opening 3 of equal cross section with the cap part I and enters on a coaxially opposite position as a gas heating exchanger-inner tube 5' into the gas heating exchanger-outer tube 7 emerging from the other cap part II. The gas heat exchanger-outer tube 7 is secured by the round seam 8 on the collector 1 and the cap part II, respectively. It passes through the opening 4 and extends with its end slightly into the collector-inner space 1'.

The gas heating exchanger-outer tube 7 and the gas heater exchanger-inner tube 5' are in cross section adjusted such to each other, that a sufficiently large annular space remains between the inner wall of the gas heat exchanger-outer tube 7 and the outer wall of the gas heater-exchanger inner tube 5'.

For the improvement of the heat exchanger, deformations 5'''' can be provided on the gas heat exchanger. The upper part of the gas heat exchanger forms the vaporizer of the cooling unit.

As can be ascertained from FIG. 1, the outer tube 5 passing through the collector 1 and then starting from the cap part I extends through over the liquid heat changer path 9, the boiler path 9', the rectification path 10, the boiler rising tube path 11 and the dephlegmator path 12 up to the liquefier 13. By this arrangement the outer tube 5 surrounds the inner tube 14 terminating separately in the collector 1 and extending up to the boiler rising tube path 11.

Also, this inner tube 14 and the passing through outer tube 5 are chosen as to their diameters such, that between the inner wall of the outer tube 5 and the outer wall of the inner tube 14 likewise is assured the required annular gap. It is here of advantage to deform the inner and outer tube such, that a favorable hydraulic diameter is created. This can by example be obtained by flat pressing of the inner tube. Furthermore, the outer tube can be deformed by thickening such that the poor solution is forced, to flow in a "cross stream" to the rich solution. The thickening avoids furthermore the development of local circulations. This all leads to an improved heat exchange coefficient of the liquid heat exchanger.

The end of the inner tube 14, reaching after finished mounting up to the inner chamber 1' of the collector 1, is radially outwardly curved. The curved section is identified by the numeral 15. The tube-end face 16 has an end side curvature corresponding with the inner wall contour of the outer tube 5. This tube-end face 16 is produced by premounting on the bore edge of a bore 17, equal as to form, which brings about the stream technical connection of the inner tube 14 with the collector inner chamber 1', by means of welding. Prior to coordination of the inner tube 14 to the outer tube 5, the inner tube 14 is connected with the pump tube 18 of the unit. The latter is inserted during joining of the structural parts on the other cross sectionally reduced end of the inner tube 14 and connected by means of a round seam 19 with this inner tube 14. The pump tube 18 extends, again with providing of an annular gap, inside of the inner tube 14. It reaches beyond the rectification insert 20. This insert is formed as a rolled sieve insert or of disks perforated in longitudinal direction, which disks are mounted on the inner tube 14 and finally are connected by means of around seam or by means of welding with the inner tube 14.

This structural unit, consisting of the inner tube 14, the pump tube 18 and the rectification insert 20, is inserted from the open end 5" of the outer tube 5 into the latter and held by welding of the radially directed curved section 15 of the inner tube 14 in the outer tube 5.

It can also be suitable, to separate the outer tube 5 for the purpose of better insertion of the above stated structural unit shortly above the welding seam 17 and later welded together again.

In the state in which it is boxed into each other, the pump tube 18 extends then up to the front of the dephlegmator path 12.

Upon coordination of the mentioned structural unit in accordance with FIG. 1a to the outer tube 5, the cap part I can be connected in the mentioned manner with the outer tube 5. In this case the free end 5" of the outer tube 5 surpasses the cap edge. This free end 5" is now inserted by passing through the cap part II into the gas heat exchanger outer tube 7. Thereafter, the connection of the two cap parts I and II takes place in the plane x—x. The seam is identified by the numeral 21.

Figure 2:
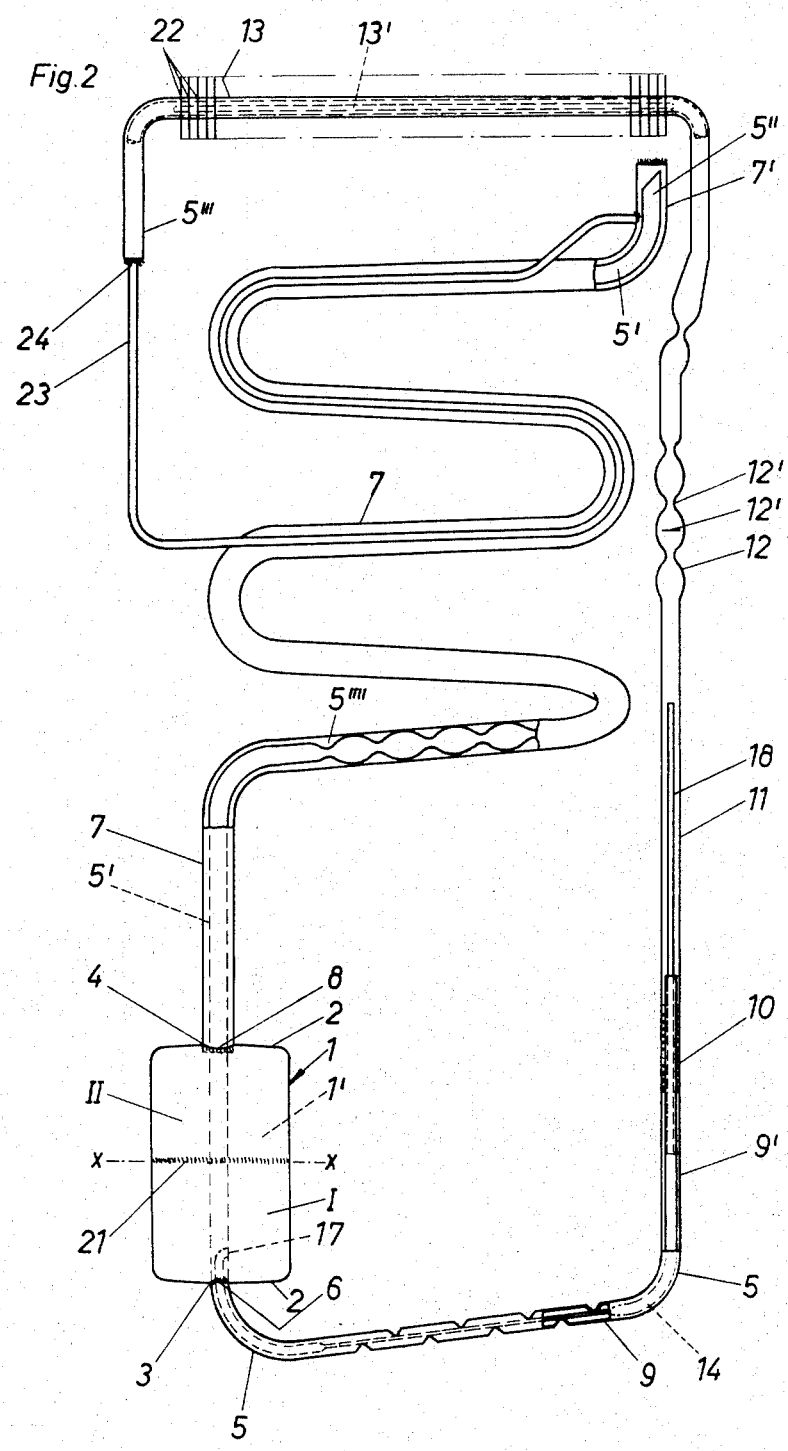
FIG. 2 is an elevation of the absorption unit in a state after the bending forming for obtaining of the desired curvature of the conduit or tube.

Following this manufacturing process, thus after boxing into each other, a provision of all tube welding seams, the structure shown in FIG. 1 is bent from the straight arrangement (axis y—y) into the desired curvature arrangement. FIG. 2 shows the state of the absorption cooling unit after performed bending process.

Prior to or however, thereafter, the liquid heat exchanger path 9 is brought into the form particularly clearly described before. Suitably also before takes place the typical formation of the dephlegmator path, by section like, angularly set-off flattening of the section of the passing through the outer tube 5. The corresponding grooves created thereby are indicated as the numeral 12' (compare FIG. 1). Also the ribs 22 for the liquefier 13 were coordinated to the production state shown in FIG. 1, and, in particular, prior to the welding of the tube 23 by a welding seam 24.

Within the range of the liquefier 13 the outer tube 5 is equipped for the reduction of the cross section with a displacement tube 13' centrally inserted, smaller as to its diameter and closed on both sides, in order to increase in this range a steam speed and thus to improve the heat exchange and to prevent the innert gas counter stream to a great extent.

The outer tube 5, leaving the collector 1 in FIG. 2 below, rises at first at a slight angle. Over a curved section the outer tube 5 continues in the upwardly directed section forming the boiler 9', the rectification path 10 and the rising tube 11, which section contains also the pump tube 18, in order to be transferred with formation of the dephlegmator path 12 into the liquefier 13 bent in horizontal direction. Thereafter, the passing through outer tube 5 falls downwardly. It is transformed into the ammonia tube 23 which is of smaller cross section. Both tubes are connected together by the round seam 24. Although this round seam 24 is provided in the intermediate state shown in FIG. 1.

The ammonia tube 23 runs then after curvature in opposite direction parallel to the gas heat exchanger-outer tube 7, which at one end, as mentioned, is connected with the cap part II of the collector 1, and at the other end is closed. The ammonia tube 23 enters before this closed end 7' into the gas heat exchanger-outer tube 7. The end section has at a corresponding connection point a passage opening, which connects the ammonia tube 23 with the annular chamber between the inner wall of the gas heat exchanger-outer tube 7 and the outer wall of the gas heat exchanger-inner tube 5' extending therein. The upper part of the gas heat exchanger-outer tube 7 constitutes the vaporizer of the cooling unit.

Figure 3:
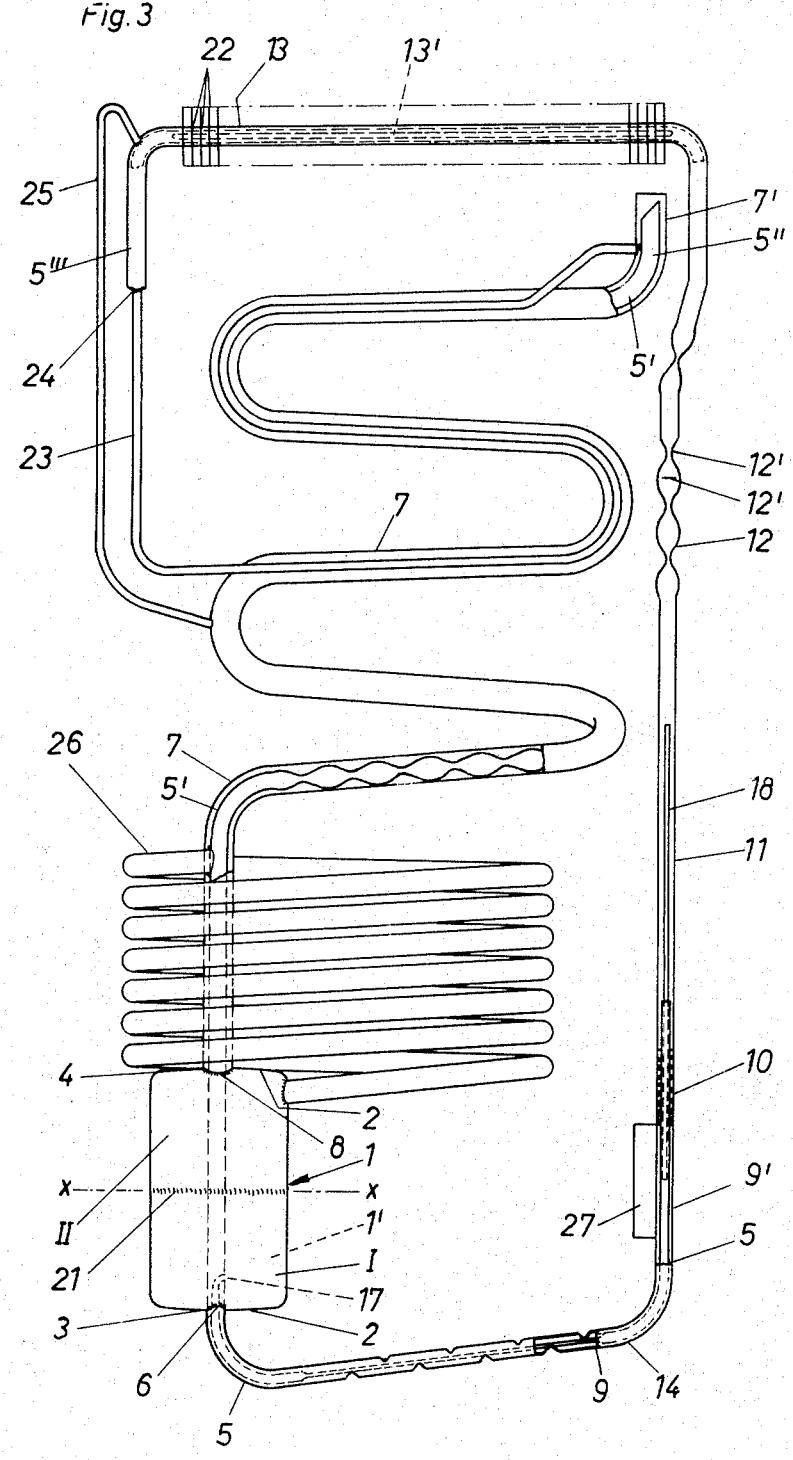
FIG. 3 is an elevation of the absorption unit in a completed state.

Thereafter, merely a connection tube 25 is to be provided between the other end section 5''' of the outer tube 5 and the gas heat exchanger-outer tube 7 (see FIG. 3). Furthermore, still the absorption coil 26 is provided. The latter exits in the vicinity of the bottom 2 of the cap part II and is connected with the other end while passing the gas heat exchanger-outer tube 7 with a gas heat exchanger-inner tube 5', which passes also the bottom 2 of the cap part II of the collector 1.

In a last production step, a heat member chamber 27 is coordinated to the absorption cooling unit. The latter is disposed within the range of the boiler 9' below the rectification insert 20.

Figure 4:
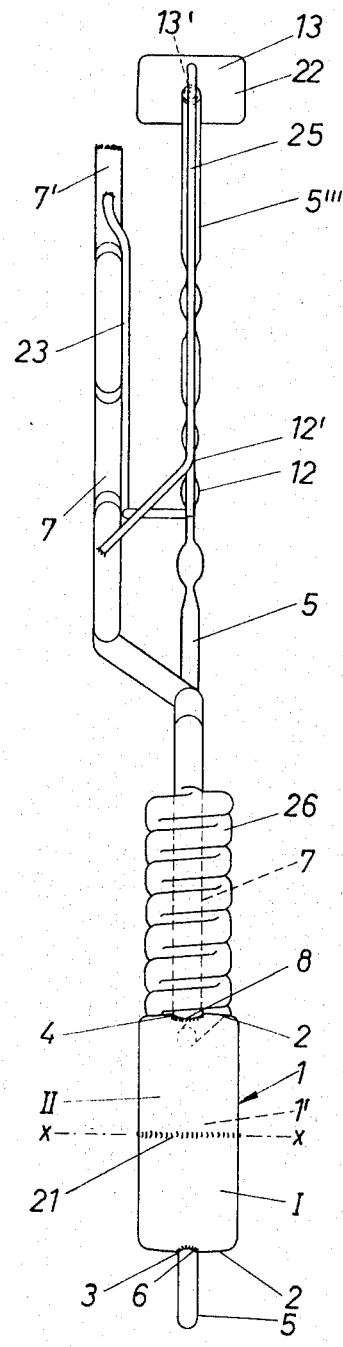
FIG. 4 is an elevation of the absorption unit with marking of the bending of the predetermined tube section.

By further tube deformations and form technical recognition of the later added tube sections, the basic form extending in two planes and being flat as shown in FIG. 4, is obtained.

While we have disclosed several embodiments of the present invention, it is to be understood that these embodiments are given by example only and not in a limiting sense.

We claim:

1. An assembly for an absorption-cooling unit comprising
    a collector having a collector housing having a longitudinal axis and including two cap parts welded together in a cross-plane to said axis and each having a bottom face on opposite sides of said housing,
    a plurality of conduits originating from said collector and at least partly boxed into each other,
    said conduits starting from both of said bottom faces of said cap parts of said collector housing in coaxial alignment,
    one of said conduits comprising a gas-heat exchanger outermost tube originating from said bottom face of one of said cap parts,
    another of said conduits comprising an outer tube starting from the bottom face of said other of said cap parts and extending through said collector housing and entering in coaxially opposite position thereto and constituting thereat a gas-heat exchanger inner tube disposed coaxially inside said gas-heat exchanger outermost tube,
    said outer tube from said other cap part extends over a liquid heat exchanger path, a boiler path, a rectification path, a boiler rising tube path and a dephlegmator path to a liquefier,
    an inner tube terminating separately into said collector, said inner tube extending coaxially inside said outer tube away from said collector and said other cap part thereof up to said boiler rising tube path,
    a following pump tube extending inside of and welded to one end of said inner tube remote from said collector and adjacent said boiler rising tube path, in order to bend said unit, only after boxing into each other of said conduits and providing of all tube-welding seams on the conduits, from its straight lined arrangement coaxial to said longitudinal axis of said collector housing, into a predetermined curved state.

2. The assembly, as set forth in claim 1, which includes
    an absorption coil emerging in the vicinity of said bottom face of said one of said cap parts cross-wise from said cap wall, and enters with its opposite end into said outer tube, the latter passing through said bottom of said one cap part.

3. The assembly, as set forth in claim 1, which includes
    a displacement tube provided in said liquefier for increase of the steam speed.

4. A method of constructing an assembly for an absorption cooling device, comprising the steps of
    coaxially joining an inner tube at one end thereof to a pump tube, the latter being positioned coaxially inside the former,
    coaxially inserting said inner tube inside an outer tube,
    welding an upper radially turned end of said inner tube to a bore portion of said outer tube,
    connecting a first cap part of a collector having a bottom opening about said outer tube at a position such that said radially turned end of said inner tube terminates inside said cap,
    passing an other cap part of said collector having a bottom opening about said outer tube such that the latter extends through said collector and through the bottom opening of said other cap part,
    welding the two cap parts in a cross plane, cross to the longitudinal axis of the said collector, said outer tube extending coaxially to said longitudinal axis.
    coaxially positioning a heat exchanger outermost tube about a portion of said outer tube which extends away from said collector away from said bottom opening of said other cap part,
    welding said heat exchanger outer tube about the bottom opening of said other cap part to said other cap part,
    the welding steps comprising the step of turning of said collector about the coaxial axis of said collector of said tubes, and
    thereafter bending said welded tubes connected with said collector.

* * * * *